(12) United States Patent
Torres et al.

(10) Patent No.: US 10,518,900 B2
(45) Date of Patent: Dec. 31, 2019

(54) THERMAL CALIBRATION OF AN INFRARED IMAGE SENSOR

(71) Applicant: MicaSense, Inc., Seattle, WA (US)

(72) Inventors: Gabriel Torres, Seattle, WA (US); Justin McAllister, Seattle, WA (US); Jefferson McBride, Seattle, WA (US)

(73) Assignee: MicaSense, Inc., Seattle, WA (US)

( * ) Notice: Subject to any disclaimer, the term of this patent is extended or adjusted under 35 U.S.C. 154(b) by 155 days.

(21) Appl. No.: 15/620,627

(22) Filed: Jun. 12, 2017

(65) Prior Publication Data

US 2017/0358105 A1 Dec. 14, 2017

Related U.S. Application Data

(60) Provisional application No. 62/350,116, filed on Jun. 14, 2016.

(51) Int. Cl.
| | | |
|---|---|---|
| *B64D 47/08* | (2006.01) | |
| *H04N 5/33* | (2006.01) | |
| *H04N 17/00* | (2006.01) | |
| *B64C 39/02* | (2006.01) | |

(52) U.S. Cl.
CPC .............. *B64D 47/08* (2013.01); *H04N 5/33* (2013.01); *H04N 17/002* (2013.01); *B64C 39/024* (2013.01); *B64C 2201/123* (2013.01)

(58) Field of Classification Search
CPC ........ B64D 47/08; H04N 5/33; H04N 17/002; B64C 2201/123; B64C 39/024
See application file for complete search history.

(56) References Cited

U.S. PATENT DOCUMENTS

| | | | |
|---|---|---|---|
| 7,056,012 | B2 | 6/2006 | Blakeley, III |
| 7,111,981 | B2 | 9/2006 | Blakeley, III |
| 7,163,336 | B2 | 1/2007 | Blakeley, III |
| 7,168,316 | B2 | 1/2007 | Blakeley, III |
| 7,192,186 | B2 | 3/2007 | Blakeley, III |
| 7,452,127 | B2 | 11/2008 | Blakely, III |
| 8,208,026 | B2 | 6/2012 | Högasten et al. |
| 8,520,970 | B2 | 8/2013 | Strandemar |
| 8,565,547 | B2 | 10/2013 | Strandemar |
| 8,727,608 | B2 | 5/2014 | Blakeley, III |
| 8,749,635 | B2 | 6/2014 | Högasten et al. |
| 8,766,808 | B2 | 7/2014 | Hogasten |
| 8,780,208 | B2 | 7/2014 | Högasten et al. |
| 9,058,653 | B1 | 6/2015 | Kostrzewa et al. |
| 9,083,897 | B2 | 7/2015 | Högasten et al. |
| 9,143,703 | B2 | 9/2015 | Boulanger et al. |

(Continued)

FOREIGN PATENT DOCUMENTS

WO 2011/131758 A1 10/2011

*Primary Examiner* — Nam D Pham
(74) *Attorney, Agent, or Firm* — Seed Intellectual Property Law Group LLP

(57) ABSTRACT

The present disclosure is directed to a system and method of capturing and calibrating thermal images to provide accurate temperature information regarding an imaged area. The system includes a thermal image sensor positioned next to a non-contact temperature sensor. The system identifies pixels of the thermal image that correspond to a field of view of the temperature sensor and generates a calibration value by analyzing the pixels and the temperature information. Then the thermal image is biased or calibrated using the calibration value.

14 Claims, 9 Drawing Sheets

(56) References Cited

U.S. PATENT DOCUMENTS

| | | |
|---|---|---|
| 9,171,361 B2 | 10/2015 | Strandemar |
| 9,207,708 B2 | 12/2015 | Simolon et al. |
| 9,208,542 B2 | 12/2015 | Högasten et al. |
| 9,235,023 B2 | 1/2016 | Burt et al. |
| 9,235,876 B2 | 1/2016 | Högasten et al. |
| 9,237,284 B2 | 1/2016 | Högasten et al. |
| 9,247,131 B2 | 1/2016 | Kostrzewa et al. |
| 9,292,909 B2 | 3/2016 | Högasten et al. |
| D765,081 S | 8/2016 | Frank et al. |
| 9,451,183 B2 | 9/2016 | Högasten et al. |
| 9,471,970 B2 | 10/2016 | Strandmar |
| 9,473,681 B2 | 10/2016 | Hoelter et al. |
| 9,509,924 B2 | 11/2016 | Terre et al. |
| 9,517,679 B2 | 12/2016 | Frank et al. |
| 9,521,289 B2 | 12/2016 | Dart et al. |
| 9,538,038 B2 | 1/2017 | Sieh et al. |
| 9,635,285 B2 | 4/2017 | Teich et al. |
| 9,674,458 B2 | 6/2017 | Teich et al. |
| 9,706,137 B2 | 7/2017 | Scanlon et al. |
| 9,706,138 B2 | 7/2017 | Teich et al. |
| 9,706,139 B2 | 7/2017 | Nussmeier et al. |
| 9,716,843 B2 | 7/2017 | Fox et al. |
| 9,716,844 B2 | 7/2017 | Nussmeier et al. |
| 9,723,227 B2 | 8/2017 | Högasten et al. |
| 9,723,228 B2 | 8/2017 | Boulanger et al. |
| 2009/0256077 A1* | 10/2009 | Brady ............ G01J 5/0003 250/330 |
| 2011/0261207 A1 | 10/2011 | Strandemar |
| 2012/0262584 A1 | 10/2012 | Strandemar |
| 2013/0173435 A1 | 7/2013 | Cozad, Jr. |
| 2013/0250125 A1 | 9/2013 | Garrow et al. |
| 2013/0253551 A1 | 9/2013 | Boyle et al. |
| 2013/0258111 A1 | 10/2013 | Frank et al. |
| 2013/0278771 A1 | 10/2013 | Magoun et al. |
| 2013/0300875 A1 | 11/2013 | Strandemar et al. |
| 2013/0314536 A1 | 11/2013 | Frank et al. |
| 2013/0321637 A1 | 12/2013 | Frank et al. |
| 2013/0342691 A1 | 12/2013 | Lewis et al. |
| 2014/0085482 A1 | 3/2014 | Teich et al. |
| 2014/0092256 A1 | 4/2014 | Simolon et al. |
| 2014/0112537 A1 | 4/2014 | Frank et al. |
| 2014/0139643 A1 | 5/2014 | Högasten et al. |
| 2014/0168433 A1 | 6/2014 | Frank et al. |
| 2014/0168445 A1 | 6/2014 | Högasten et al. |
| 2014/0184807 A1 | 7/2014 | Simolon et al. |
| 2014/0232875 A1 | 8/2014 | Boulanger et al. |
| 2014/0253735 A1 | 9/2014 | Fox et al. |
| 2015/0085133 A1 | 3/2015 | Teich et al. |
| 2015/0109454 A1 | 4/2015 | Strandemar et al. |
| 2015/0172545 A1 | 6/2015 | Szabo et al. |
| 2015/0288892 A1 | 10/2015 | Frank et al. |
| 2015/0296146 A1 | 10/2015 | Scanlon et al. |
| 2015/0312488 A1 | 10/2015 | Kostrzewa et al. |
| 2015/0312489 A1 | 10/2015 | Hoelter et al. |
| 2015/0312490 A1 | 10/2015 | Hoelter et al. |
| 2015/0319378 A1 | 11/2015 | Hoelter et al. |
| 2015/0319379 A1 | 11/2015 | Nussmeier et al. |
| 2015/0358560 A1 | 12/2015 | Boulanger et al. |
| 2015/0379361 A1 | 12/2015 | Boulanger |
| 2016/0074724 A1 | 3/2016 | Terre |
| 2016/0156880 A1 | 6/2016 | Teich et al. |
| 2016/0224055 A1 | 8/2016 | Simolon et al. |
| 2016/0316119 A1 | 10/2016 | Kent |
| 2016/0316154 A1 | 10/2016 | Elmfors et al. |
| 2017/0004609 A1 | 1/2017 | Strandemar |
| 2017/0078590 A1 | 3/2017 | Högasten et al. |
| 2017/0088098 A1 | 3/2017 | Frank et al. |
| 2017/0208260 A1 | 7/2017 | Terre et al. |

* cited by examiner

THERMAL CALIBRATION OF AN INFRARED IMAGE SENSOR

BACKGROUND

Technical Field

The present disclosure is directed to thermal calibration of an infrared image sensor using a remote, non-contact temperature sensing device positioned on a same substrate as and adjacent to the image sensor.

Description of the Related Art

Products that help owners and operators better utilize their land and equipment by capturing information about thermal conditions of an area. For example, this information can provide building heat analysis, solar panel heat measurements, or heat analysis of land and items on the land. Thermal imaging devices, such as an infrared sensor array, capture images about the area. These thermal imaging devices output temperature measurements, but these measurements are not necessarily calibrated to an absolute temperature scale.

BRIEF SUMMARY

The present disclosure is directed to a method and system of calibrating images from thermal imaging devices to provide accurate and calibrated temperature information of an area imaged. Such calibration may be referred to as an absolute calibration such that data output to a user reflects actual temperatures of the area imaged, in units of degrees Celsius or Kelvin or equivalent. This is achieved by incorporating an imaging device next to a non-contact temperature sensing device on a same substrate. The non-contact temperature sensing device determines temperature of a subset of the area imaged by the imaging device. The output of the imaging device is then modified or calibrated by information from the temperature sensing device such that the user can view an image or data that reflects absolute temperature information of the area imaged.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

The present disclosure is directed to a system 100 that images a physical area or scene and outputs calibrated thermal images with accurate (absolute) temperature information about the imaged area. These thermal images can be used in a variety of contexts where accurate temperature is helpful. For example, the health of crops, including water loss from the leaves, can be observed with thermal imaging. In particular, evapotranspiration of a plant can be determined by evaluating air temperature and thermal information of the leaves captured with an infrared sensor. Evapotranspiration represents the amount of water evaporating from the plant. Accordingly, a grower can evaluate the health and water needs of his/her plants by taking photographs, such as from an aerial position. The grower can then determine which of the plants to water. This avoids excess watering and allows for precise individual plant care.

Figure 1:
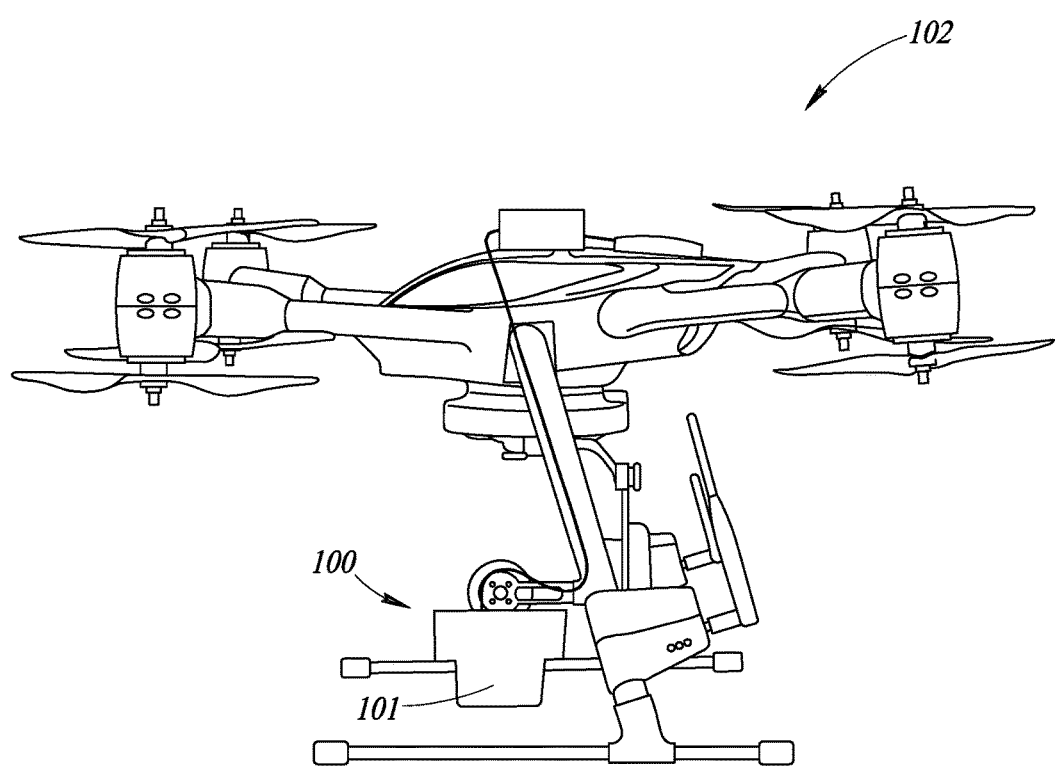
FIG. 1 is an aerial vehicle carrying a system of the present disclosure.
Figure 2:
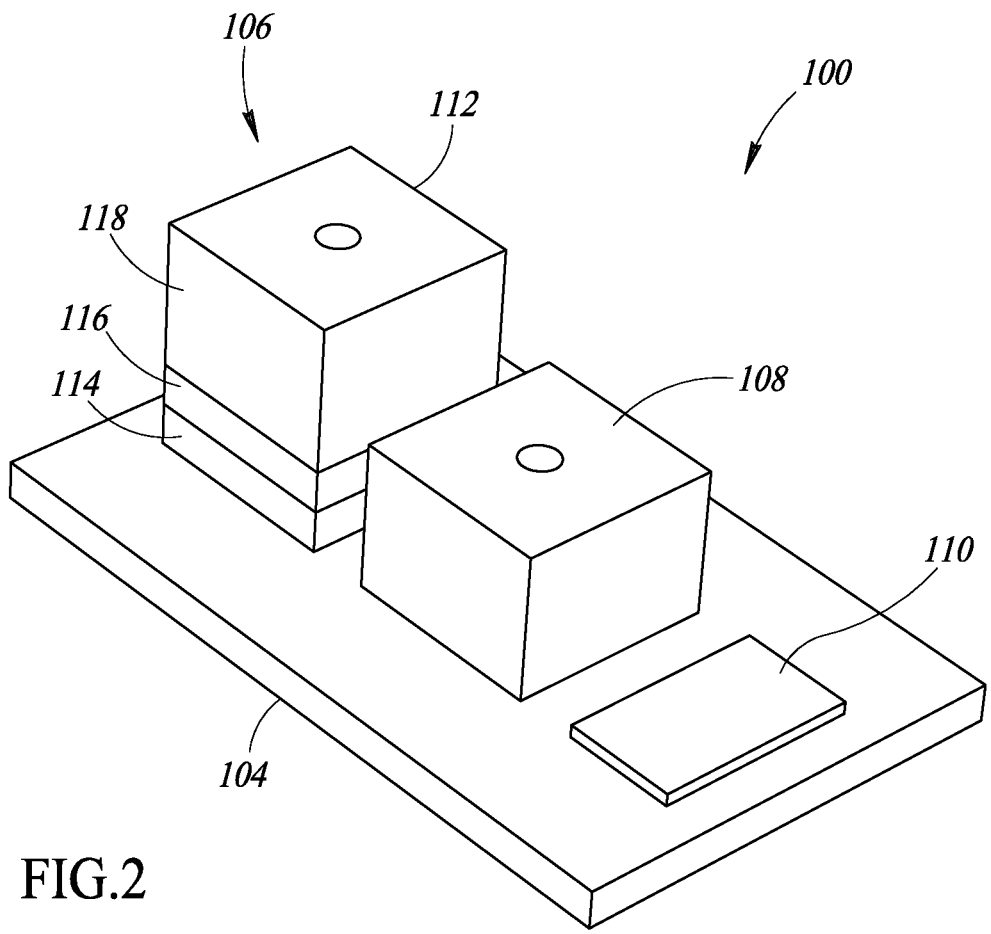
FIG. 2 is a support substrate from the system of FIG. 1.

The system 100 captures images from the ground or aerially from a manned or unmanned aerial vehicle 102, such as an airplane or a drone as illustrated in FIG. 1. The system 100 includes a housing 101 that includes a support substrate 104 having at least one thermal or infrared image sensor 106, at least one temperature sensor 108, and a processor 110 as is illustrated in FIG. 2. The housing 101 includes openings that are aligned with the temperature sensor and the imaging sensor. Both the image sensor 106 and the temperature sensor 108 transmit and receive data to and from the processor 110 through electrical connections in or on the support substrate 104 (not shown). The support substrate may be a printed circuit board or other suitable support substrate that provides electrical connections between various devices on the substrate. The electrical connections may be in the substrate or through wires on the substrate or wires between the various components.

Both the image sensor and the temperature sensor are positioned to image the same area. They are positioned adjacent to each other on the support substrate to ensure the images and data they capture overlap. Each of the image sensor and the temperature sensor may be packaged in separate packages, where each package may include a substrate. The substrate 104 is a support, that may be active or passive, that supports both the image sensor and the temperature sensor in a way that allows the fields of view of each of the sensors to be directed to a same area. The substrate 104 may be any number of shapes and sizes. For example, the support substrate 104 may be an integral piece in the housing 101 or may simply be the housing. In one embodiment, the temperature sensor may be attached to a housing or package of the image sensor, such that the support substrate that supports the image sensor supports the temperature sensor by way of the image sensor.

The processor may be a chip included on the support 104 that is coupled to both the image sensor and the temperature sensor. In other embodiments, the processor may be part of a post-processing computer to which the housing 101 that includes the image sensor and the temperature sensor are coupled after an image taking session. The thermal image sensor and the temperature sensor may capture data on their own where there is no computer on board applying calibrations. The calibrations and processing may also be performed in the cloud, a remote computing network that receives the collected data wirelessly from the image and temperature sensors or receives the data through a wired network once the housing 101 holding image and temperature sensors is coupled to a computer after the image capturing session. In another embodiment, the temperature sensor may be coupled to the image sensor such that only the image sensor sends data to the processor. The image sensor would send both the temperature sensor data and the image sensor data. In another embodiment, the image sensor may include the processor such that the temperature sensor data is received and processed by the image sensor processor.

Each image sensor 106 includes a housing 112 or some external packaging the houses an application specific integrated circuit 114, an image sensor die 116, and a lens 118. As will be appreciated by one of skill in the art, the image sensor 106 can include various die and packaging arrangements as specified by the particular implementation of the image sensor. The image sensor die 116 is an infrared image sensor die that includes an array of sensors (or pixels) that respond to long wave infrared wavelengths and whose response is reflective of temperature of the imaged area. Data output by the image sensor 106 may include non-calibrated information about temperature of the imaged area, i.e., the image sensor measures a relative difference of the temperatures in the imaged area and may provide a non-calibrated temperature output. This data primarily provides information about whether a specific item in the imaged area is hotter or colder than surrounding items.

The image sensor 116 in the image sensor 106 may include a plurality of microbolometers, which are devices that measure power of incident electromagnetic radiation in response to heating of a material that has a temperature-dependent electrical resistance. These microbolometers can be implemented as focal plan array sensors, which respond to these longer wavelengths. In particular, a microbolometric sensor detects infrared radiation in wavelengths between 7.5-14 microns as they interact with the material. As the infrared radiation hits the material it heats the material, which changes the material's electrical resistance. The change in resistance is measured and processed to create an image that represents thermal information about the area imaged. Such microbolometers may be uncooled thermal sensors.

Uncooled thermal image sensors operate at ambient temperatures, but generate their own heat during operation. The measured change in resistance that corresponds to the received infrared radiation is a function of the temperature of the focal plane array. The output data, the thermal image, must be adjusted accordingly if the operating temperature of the sensor is impacting the collected data.

Some prior solutions include incorporating complex shutter mechanisms that have known temperature within the image sensor. These shutter mechanisms are expensive, power hungry, and heavy. The shutter mechanisms are not easily incorporated into light-weight portable systems, such as the system 100, which can be easily carried and utilized by an unmanned aerial vehicle. The image sensor of the present disclosure in conjunction with the temperature sensor will provide accurate temperature information regarding the imaged area without the complex and heavy shutter mechanism.

The temperature sensor 108 outputs data about actual temperature of the area imaged by the image sensor. This system is configured to process the data from the temperature sensor 108 and adjust the data output from the image sensor 106 to provide a user with data that represents accurate temperature of features in the imaged area. The system is light-weight and cost effective for mobile applications.

The system can be configured to be positioned away from the area to be imaged and carried by hand, a moving plane or other terrestrial or aerial vehicle. The temperature sensor includes a thermopile, a pyrometer, an infrared (long wave) photodiode, or any suitable non-contact remote temperature sensing device. The temperature sensor may be a single-pixel thermopile. A thermopile is an electronic device that converts thermal energy into electrical output. The temperature sensor will output a single value that represents an average of the actual temperature across the field of view of the temperature sensor. This value is in absolute units, such as degrees Celsius. In some embodiments, the thermopile may have a lens that provides a more uniform field of view. In addition, each of the image sensors may include a manually or automatically adjustable lens.

Figure 3:
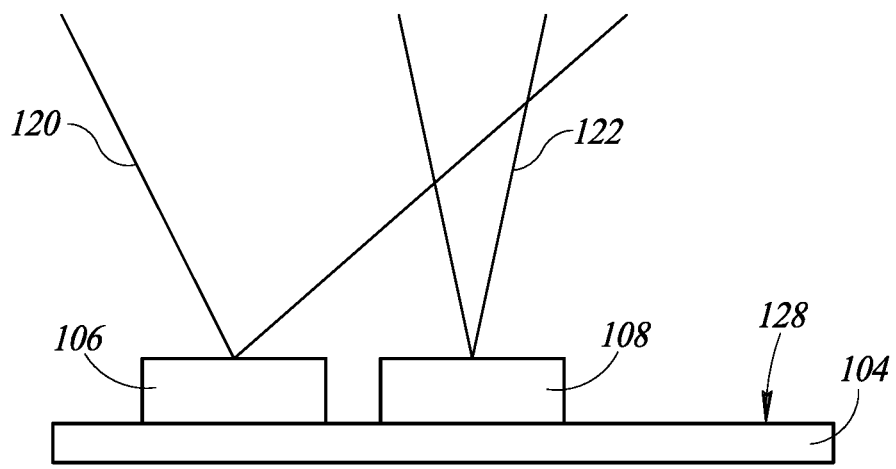
FIG. 3 is a simplified support substrate of FIG. 2.
Figure 4A:
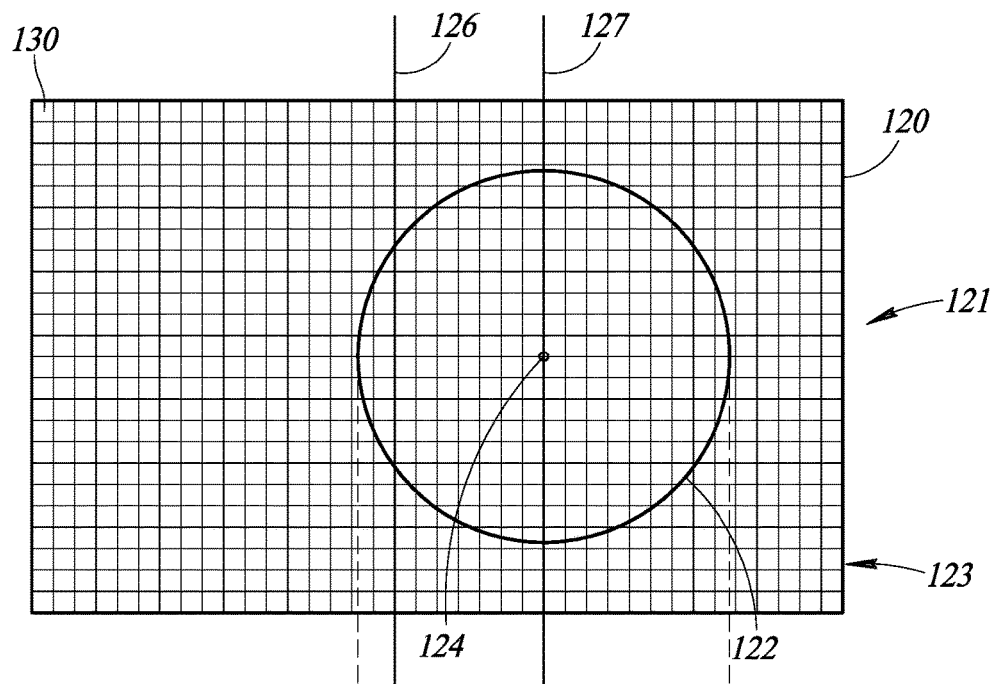
FIGS. 4A and 4B are a representation of the fields of view of an image sensor and a temperature sensor of the support substrate of FIG. 3 and a temperature profile of a field of view of the temperature sensor.

FIG. 3 is a simplified side view of the substrate 104 having the image sensor 106 and the temperature sensor 108. A field of view 120 of the image sensor 106 corresponds to an array of pixels 130 that gather thermal information about the imaged area; this will be referred to as a thermal image 121. As shown in FIG. 4A, the array of pixels 130 forms the thermal image 121 having a rectangular representation of the imaged area, such as 640 pixels wide by 480 pixels tall. The field of view 120 of the image sensor is larger than a field of view 122 of the temperature sensor 108. The field of view 122 of the temperature sensor 108 is completely overlapping with and positioned within the field of view 120 of the image sensor. In other embodiments described below, the field of view 122 of the temperature sensor maybe aligned with an outer edge 123, such that a portion of the field of view 122 extends past the edge of the pixels.

The field of view 122 is shifted to the right from a center of the field of view of the imaging sensor as the temperature sensor 108 is positioned to the right of the image sensor on the substrate 104. Said differently, a center point 124 (on a center line 127) of the field of view 122 of the temperature sensor 108 is shifted from a center line 126 of the field of view of the image sensor.

In this example, the single temperature sensor 108 is used to calibrate the entire thermal image 121. Each pixel of the thermal image 121 has a digital number that, in conjunction, with the other digital numbers indicates how hot or cold that pixel is in comparison to other pixels. The system either during operation or pre-shipment to a user, determines the pixels in each image that correspond to the field of view 122 of the temperature sensor. This includes identifying the pixels that correspond with a boundary of the field of view 122 and a pixel or group of pixels of the thermal image 121 that corresponds to the center point 124 of the temperature sensor.

Figure 4B:
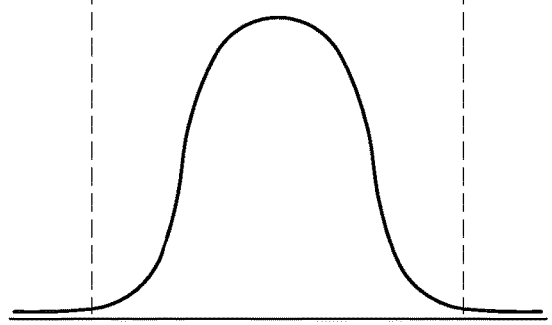

The temperature sensor 108 outputs an actual temperature that represents an average temperature of the items in the thermal image that are within the temperature sensor's field of view 122. Each of the pixels of the thermal image that are within the field of view 122 is analyzed with respect to the actual temperature to get a weighted average. For example, the center pixel, which has an x and y value, corresponds to the center point 124 of the field of view 122, is given a weight of 1. The pixels at the boundary of the field of view 122 are given a weight of 0. Moving radially from the center pixel to the boundary pixels, each pixel will be given a weight between 1 and 0, decreasing from 1 to 0 as the pixels are further from the center pixel. For example, see FIG. 4B. This weighted average is then used to calibrate the entire thermal image to create a calibrated thermal image that provides accurate temperature information about the imaged scene.

The field of view of the temperature sensor is illustrated as circular, however other shapes of the field of view, which represent the temperature information gathered are envisioned. In addition, the field of view does not have rigid boundaries. An outer-most edge may be defined by the system to utilize the most accurate data returned by the temperature sensor module. As in FIG. 4, pixels near the boundary of the field of view are given less weight as they are less accurately representative of the temperature.

Figure 5:
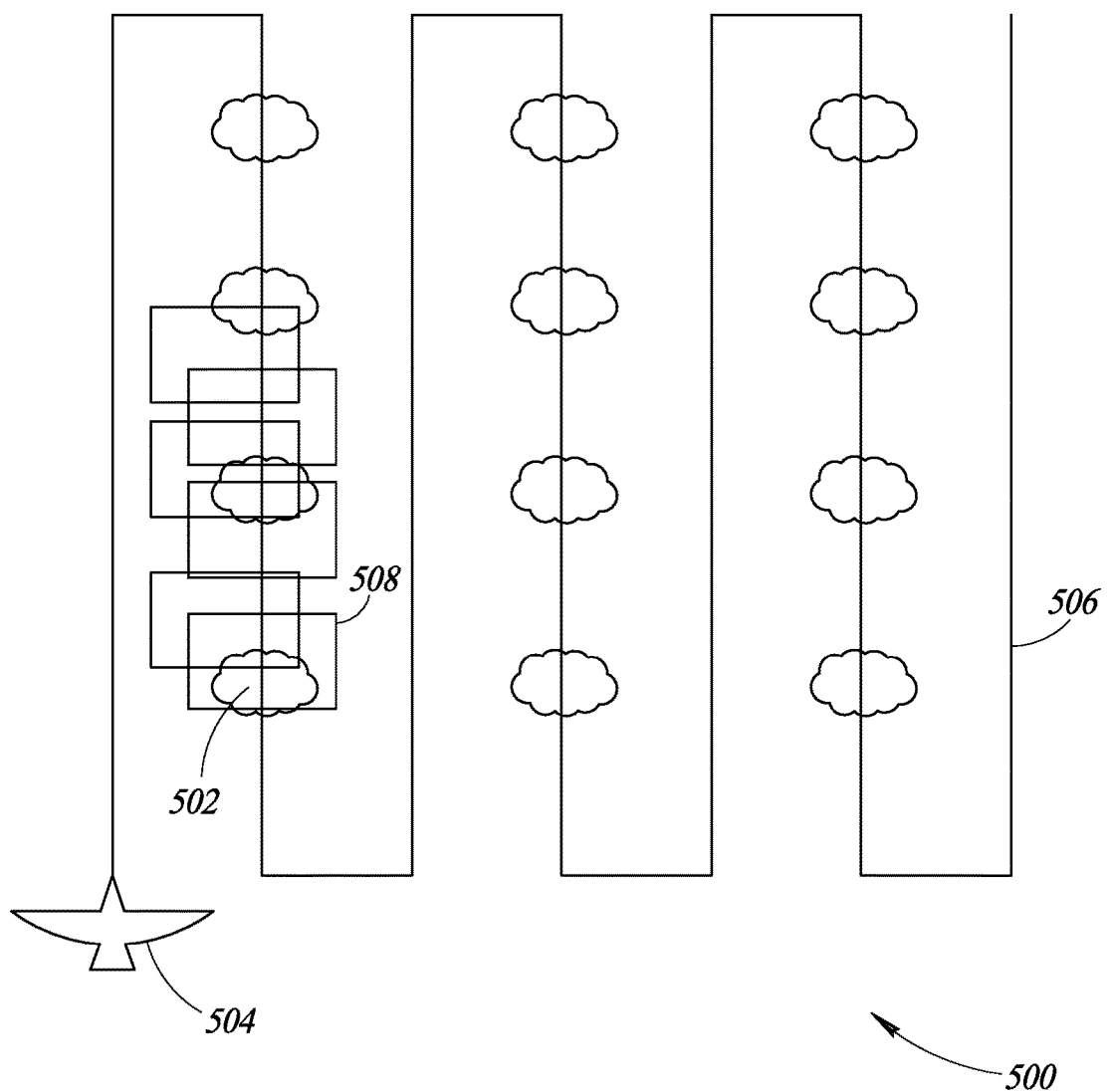
FIG. 5 is a top down view of an area to be imaged in accordance with an embodiment of the present disclosure.

Without inclusion of complicated shutter mechanisms and other components that are heavy and expensive, the thermal image sensor alone does not provide temperature data in degrees, which is very useful information for a user analyzing the data. Knowing how hot or how cold an item of the imaged area actually is can provide the user with actionable data. For example, if the imaged area is an orchard the user can determine specific watering patterns to match the needs of individual or groups of plants. Orchards are often organized in rows and columns of plants and trees such that from an aerial perspective, the plants are easily imaged and analyzed. For example, see FIG. 5, which includes an orchard 500 having a plurality of trees 502.

As mentioned above, temperature is indicative of stress of each plant or tree. It is envisioned that the system will capture a plurality of sequential images of the area, such as the orchard. For example, a drone or other aerial vehicle 504 carrying the system can fly a route 506 over the orchard. The system 100 will capture thermal images 508 either at a selected rate or frequency or simply sequentially throughout the flight. The adjacent images 508 will include overlapping subject matter regarding the scene. The system will simultaneously be gathering thermal information about the actual temperature of the orchard associated with each image. The pixels of the thermal image are evaluated to determine actual temperature information for each pixel based on the temperature information. A calibration value is determined based on the subset of the pixels that correspond to the temperature sensor and then the calibration value is used to calibrate the whole thermal image. A calibrated thermal image is created.

The calibrated thermal image may be directly output to the user. Alternatively, each of the thermal images 508 are thermally calibrated with the temperature information to generate a plurality of calibrated thermal images. Once each image is thermally calibrated, the plurality of images may be stitched together to create an image that represents the actual temperature information about an area, such as the whole orchard or a specific tree in the orchard.

FIGS. 6A-8B are examples of arrangements of a system 200 having an image sensor 202 positioned adjacent to a plurality of temperature sensors 204a-204h on a support 206 and corresponding fields of view for the image sensor 210 and the temperature sensors 212a-212h. The support will be integrated within a housing that includes openings aligned with each of the image sensors and the plurality of temperature sensors. The support also includes a processor 208 that is electrically coupled to the image sensor and the temperature sensors. The processor controls operation, including timing and duration for images captured by the image sensor and the temperature sensors. The processor 208 may include memory or a stand-alone memory may be housed on the support. The temperature information and the thermal images are either processed in real time to output the calibrated thermal image or stored in memory and processed at a later time.

Figure 6A:
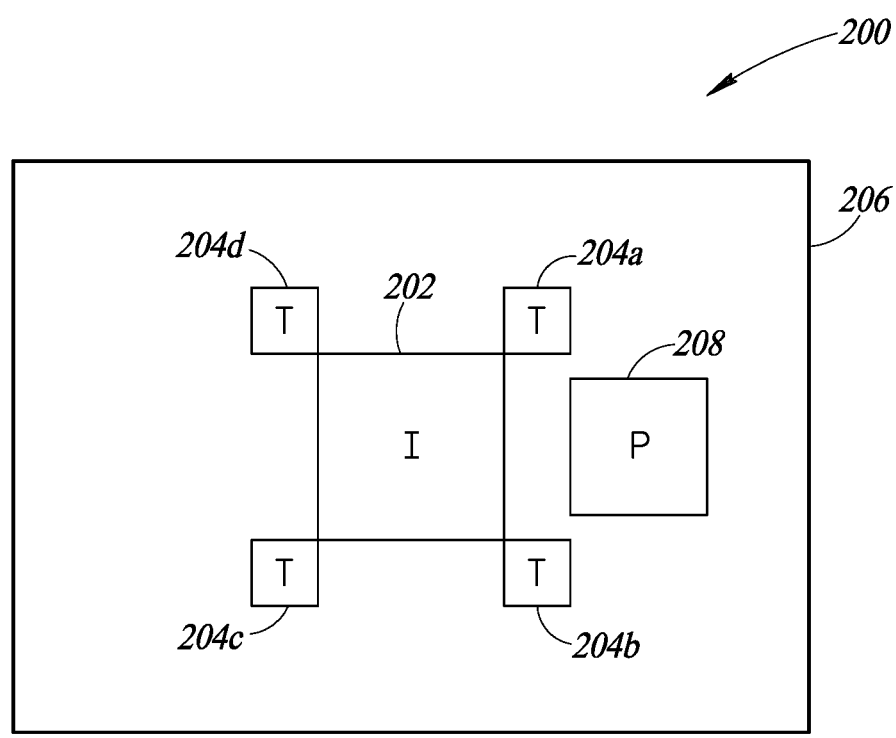
FIGS. 6A and 6B are an arrangement of an image sensor and a plurality of temperature sensors and corresponding fields of view.
Figure 6B:
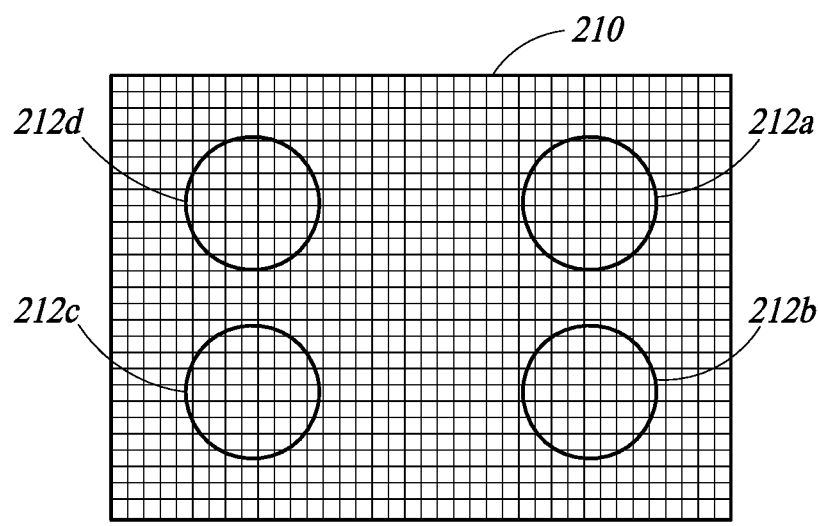

FIG. 6A includes the image sensor 202 centrally positioned on the support 206 and four temperature sensors 204a-204d positioned at corners of the image sensor. The fields of view 212a-212d of the temperature sensor modules shown in FIG. 6B correspond to specific, distinct regions of the field of view 210 of the image from the image sensor. A size of the field of view of each temperature sensor can be selected for a particular implementation. For example, the field of view 212a corresponding to the temperature sensor 204a may be larger than illustrated to cover a larger portion of the array of pixels associated with the field of view 210 of the image sensor.

The system is configured to determine a calibration value, such as a weighted average for each of the fields of view 212a-212d. The calibration value may then be applied to a quadrant of the pixels of the image from the image sensor within which the field of view is positioned. Alternatively, a final calibration value may be determined from the four calibration values such that the thermal image from the image sensor is calibrated with the final calibration value. For example, the four calibration values that correspond to the weighted average generated for the four fields of view of the four temperature sensors may be averaged together or may be used to generate a regression-based calibration curve. This collective or final calibration value is then applied to every pixel of the thermal image to generate the calibrated thermal image.

Figure 7A:
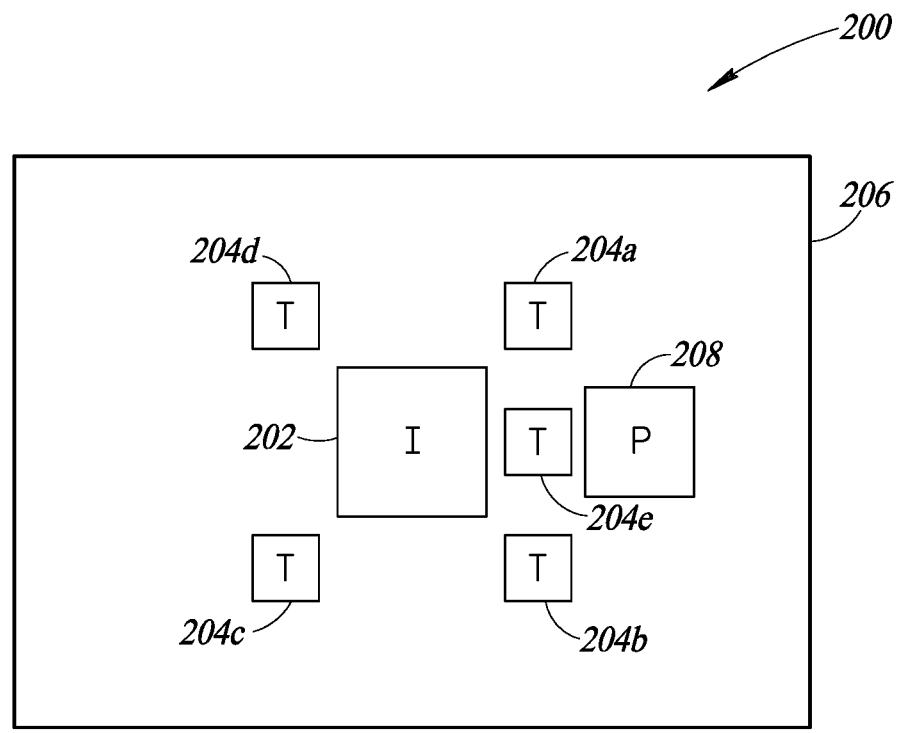
FIGS. 7A and 7B are an arrangement of an image sensor and a plurality of temperature sensors and corresponding fields of view.
Figure 7B:
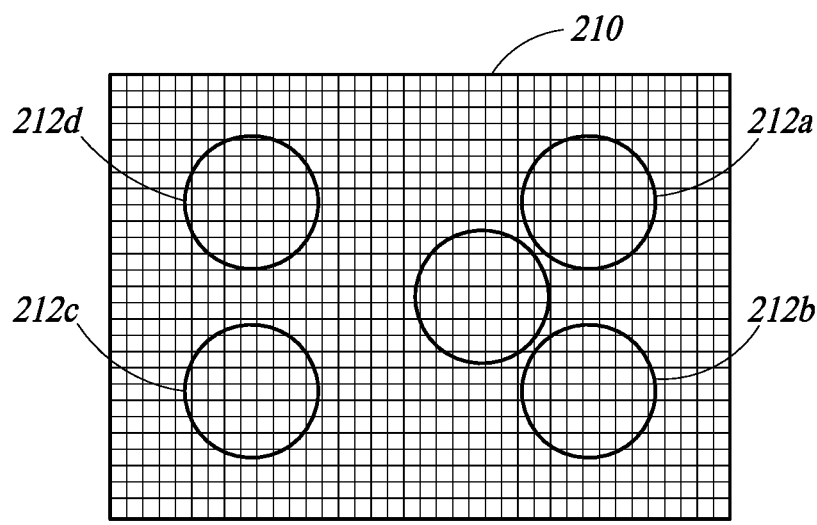

FIG. 7A is a different arrangement of the system 200 including five temperature sensors, the four previously discussed in FIG. 6A and a fifth temperature sensor 204e positioned between the first temperature sensor 204a and the second temperature sensor 204b. As in FIG. 7B, the fifth temperature sensor 204e may have a larger field of view 212e and may be positioned to have the field of view 212e cover a central area of the field of view 210 not covered by the other fields of view 212a-212d.

Figure 8A:
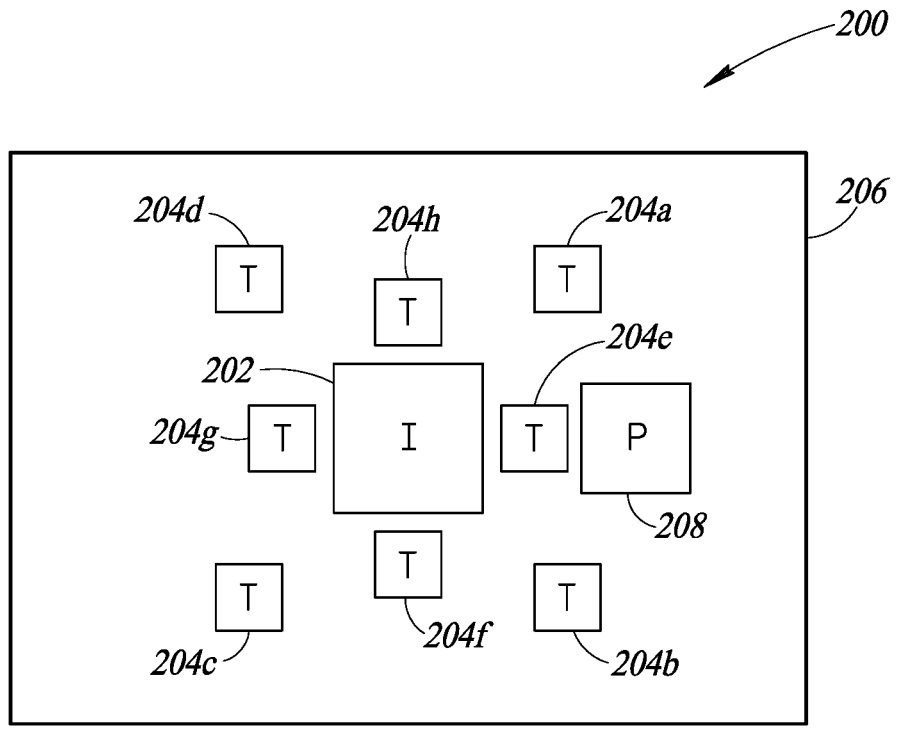
FIGS. 8A and 8B are an arrangement of an image sensor and a plurality of temperature sensors and corresponding fields of view.
Figure 8B:
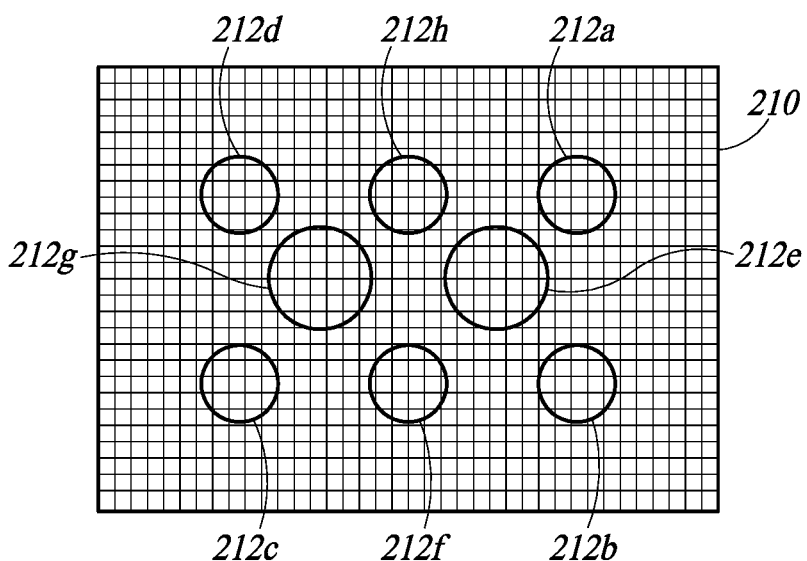

FIG. 8A is another arrangement of the system 200 including eight temperature sensors 204a-204h positioned around the image sensor 202. FIG. 8B illustrates the various fields of view 212a-212h of the temperature sensors. In this arrangement, the temperature sensors 204g and 204e have wider fields of view than the temperatures sensors 204a, 204b, 204c, 204d, 204f, and 204h. The field of view size may be selected to maximize the area of the thermal image that corresponds to a field of view of the temperature sensor. Any number of temperature sensors may be included to give more accurate temperature information to the system for use in calibration of the image ultimately provided to the user.

In some embodiments, the field of view of the temperature sensors may overlap. The weighted averages from each field of view may be compared with each other to confirm the actual temperature of the scene. For example, the system could determine the temperature associated with the portion of the field of view that is overlapping with an adjacent field of view. The values that represent each of the overlapping sections can be compared to determine if they are reading a similar temperature. If they are slightly off, the system generates an offset that calibrates the calibration value before calibrating the whole thermal image. This gives the system more precise temperature information, which results in a more precise calibrated thermal image to provide to the user or to further process.

Figure 9A:
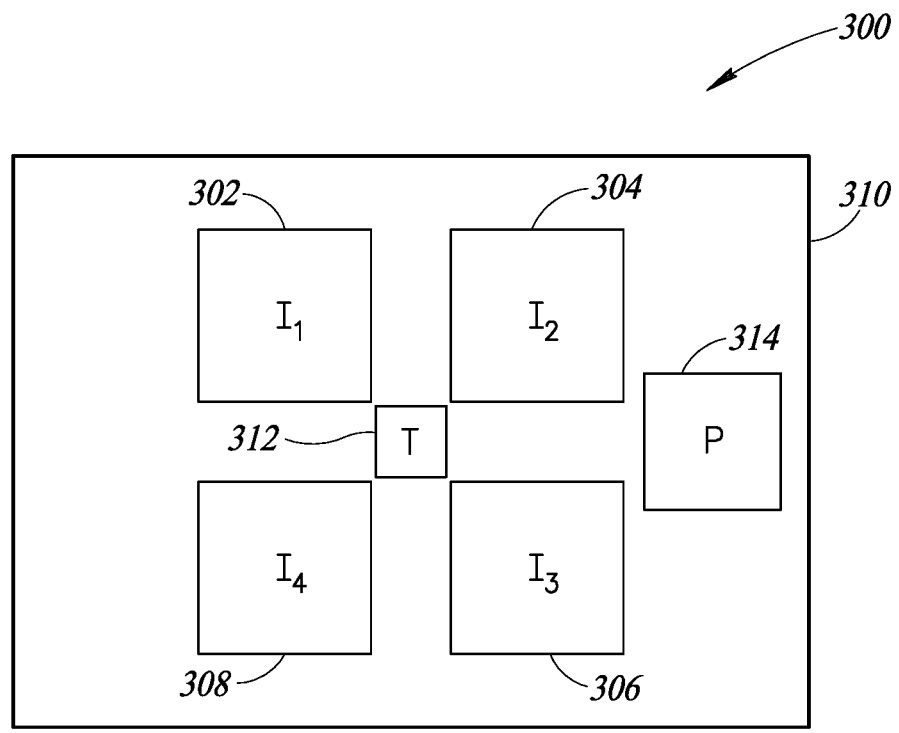
FIGS. 9A and 9B are an arrangement of a plurality of image sensors and a temperature sensors and corresponding fields of view.

FIG. 9A is an alternative arrangement of a system 300 including a first image sensor 302, a second image sensor 304, a third image sensor 306, and a fourth image sensor 308, which are positioned on a substrate 310 around a temperature sensor 312. A processor 314 is positioned on the substrate 310 and in electrical communication with the image sensors and the temperature sensor.

Each image sensor may include a different lens and a different field of view. This provides a user with flexibility regarding an amount of zoom available from the system. For example, if the user is operating and reviewing data in real time, the user may identify a portion of the area for which they want more information regarding temperature. The system can then zoom in on the portion using a different one of the image sensors that has a different field of view.

In addition, the image sensors may be operated sequentially or in a pattern such that during an imaging phase a plurality of images having different fields of view are gathered and later processed. The temperature sensor gathers temperature information during the whole imaging phase and based on time and duration information, the images from the different image sensors can be matched and calibrated from the temperature sensor data.

Figure 9B:
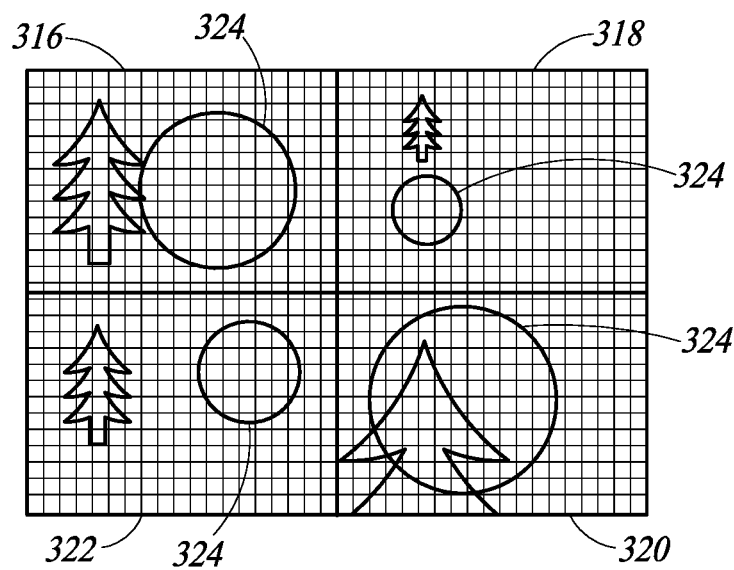

FIG. 9B includes four images. A first image 316 corresponds to the first image sensor 302 having a first zoom. A second image 318 corresponds to the second image sensor 304 having a second zoom. The second image 318 captures more of the area than the first image. A third image 320 corresponds to the third image sensor 306 having a third zoom. The third image 320 captures a narrower portion of the area than the first and second image. A fourth image 322 corresponds to the fourth image sensor 308 and has a fourth zoom. A field of view 324 of the temperature sensor 312 overlaps a different portion of each image as a relative position between the sensor and each image sensor is different.

Each of the thermal images gathered from each of the image sensors can be calibrated with the temperature information gathered by the temperature sensor. In processing, the calibration value determined from the temperature information and the pixels of the thermal image that correspond to the field of view of the temperature sensor can be compared to make the temperature information output with the calibrated thermal image more accurate.

For each of the examples described in this disclosure, the image sensor or modules and the temperature sensor or modules are aligned on the support substrate to ensure overlap of the field of views of the modules. For reference, the image sensor 106 and temperature sensor 108 of FIG. 3 will be discussed, however, the discussion applies to all examples and iterations discussed in this application.

In some implementations, the temperature sensor may be slightly angled off a first surface 128 to adjust a position of the field of view 122 with respect to the field of view 120 of the image sensor. For example, as noted above, as a result of being physically next to the image sensor, the field of view of the temperature sensor is shifted from the center line 126 of the field of view of the image sensor. To better align the center point 124 with the center line 126, one or both of the modules may be angled with respect to the first surface of the substrate, i.e. a bottom surface of the module may have a first portion closer to the substrate than a second portion. Ideally, there is no angle for either the temperature sensor or the image sensor with respect to the first surface of the substrate as the modules will be physically very close, resulting in overlap of their fields of view. In addition, the scene or area being imaged is typically at a large distance from the system as compared to a distance between the image sensor and the temperature sensor.

Other than providing the user with accurate temperature information regarding the area or scene imaged, incorporating the temperature sensor within this system can provide information about the vignette effect of the image sensor.

Figure 10:
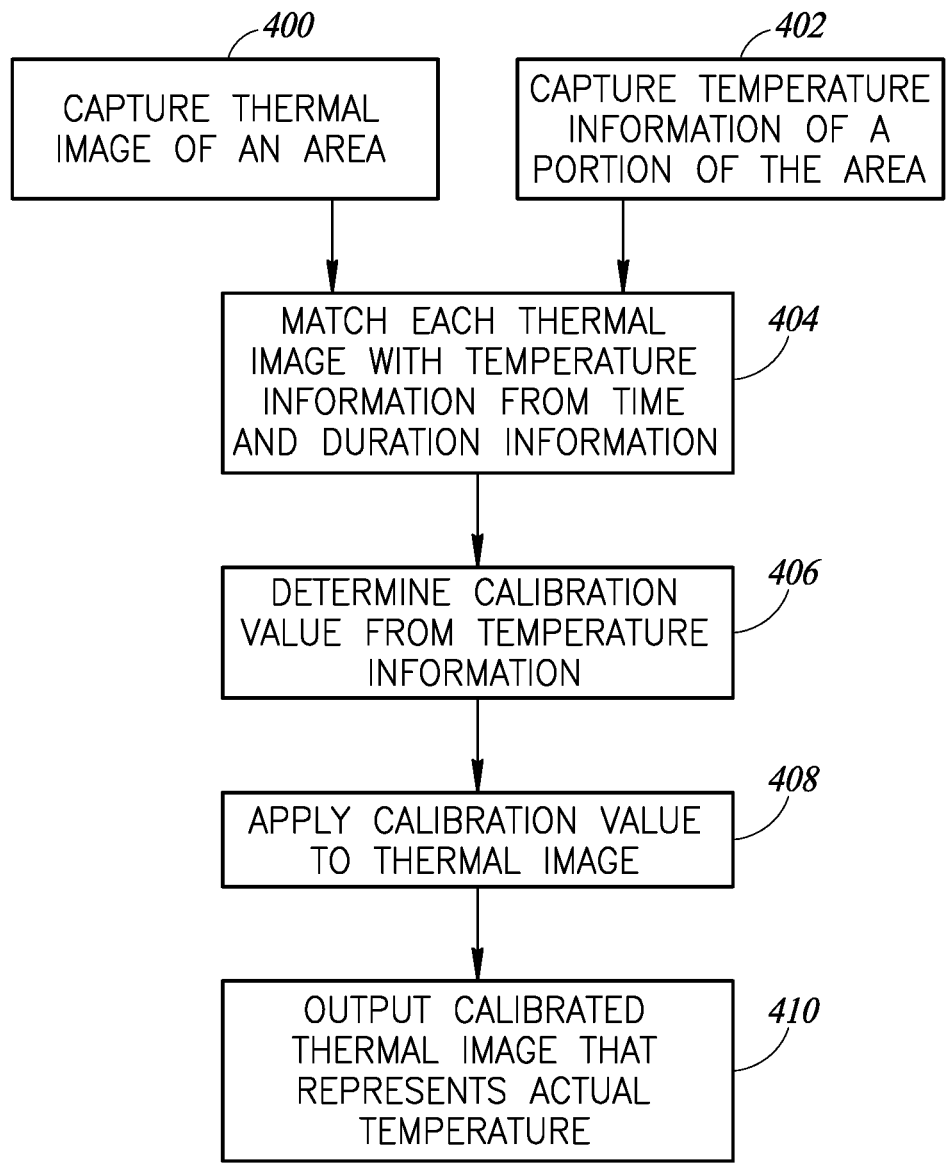
FIG. 10 is a flowchart of a method of capturing and calibrating images.

FIG. 10 is a flowchart of a method of the present disclosure. The method includes capturing a thermal image of an area with an image sensor in step 400. The capturing includes capturing the thermal images on a specific clock cycle, which can be controlled by a clock of the system. The method also includes capturing temperature information in step 402, which may also be captured or stored in accordance with the clock cycle. The thermal images and the temperature information can be matched in post-processing by the clock cycle data. For example, step 404 includes matching each thermal image with the corresponding temperature information based on duration and time information. Step 406 includes determining a calibration value from the temperature information and from the specific pixels of the thermal image that overlap with the field of view of the temperature sensor.

Step 408 includes applying the calibration value to the thermal image to change the digital number of each pixel to represent a temperature value, such as in degrees Celsius. The method then includes outputting a calibrated thermal image representative of actual temperature of the scene in step 410. Each pixel will have a temperature value so that when viewed as a whole the various temperatures across the imaged area will be visible. This process can be performed on a subset of the thermal images such that a calibration value may be applied to a sequence of thermal images or the process can be applied to every single thermal image gathered by the system.

In the description, certain specific details are set forth in order to provide a thorough understanding of various embodiments of the disclosure. However, one skilled in the art will understand that the disclosure may be practiced without these specific details. In other instances, well-known structures have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and appended claims, the use of "correspond," "corresponds," and "corresponding" is intended to describe a ratio of or a similarity between referenced objects. The use of "correspond" or one of its forms should not be construed to mean the exact shape or size.

In the drawings, identical reference numbers identify similar elements or acts. The size and relative positions of elements in the drawings are not necessarily drawn to scale.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a support;
   a first infrared image sensor on the support, the first image sensor configured to output a thermal image representing an area;
   a first temperature sensor on the support adjacent to the first infrared image sensor, the first temperature sensor configured to output first temperature information corresponding to a subset of the area; and
   a processor coupled to the first image sensor and the first temperature sensor and configured to calibrate the thermal image with the first temperature information to output a calibrated thermal image, the processor being on the support.

2. The device of claim 1 wherein the processor is a component of the first image sensor and the first temperate sensor is coupled to the first image sensor.

3. The device of claim 1, further comprising a second temperature sensor on the support, the first infrared sensor being positioned between the first temperature sensor and the second temperature sensor, the second temperature sensor being configured to generate second temperature information corresponding to a subset of the area.

4. The device of claim 3 wherein the first image sensor has a first field of view, the first temperature sensor has a second field of view that is smaller than the first field of view, and the second temperature sensor has a third field of view that is smaller than the first field of view.

5. The device of claim 4 wherein the second and third fields of view are non-overlapping.

6. The device of claim 4 wherein the thermal image includes a first plurality of pixels, the second field of view overlaps with a second plurality of pixels of the first plurality of pixels, and the third field of view overlaps with a third plurality of pixels from the first plurality of pixels.

7. The device of claim 6 wherein the processor is configured to generate a first calibration value from the second plurality of pixels and the first temperature information and a second calibration value from the third plurality of pixels and the second temperature information, the processor configured to calibrate the thermal image with the first and second calibration values to form the calibrated thermal image.

8. The device of claim 1, further comprising a plurality of second temperature sensors arranged around the first image sensor.

9. The device of claim 1, further comprising a second image sensor, the first temperature sensor being positioned between the first image sensor and the second image sensor.

10. A device, comprising:
    a support;
    a first infrared image sensor on the support, the first image sensor configured to output a thermal image representing an area;
    a first temperature sensor on the support adjacent to the first infrared image sensor, the first temperature sensor configured to output first temperature information corresponding to a subset of the area, the first image sensor has a first field of view and the first temperature sensor has a second field of view that is smaller than the first field of view; and
    a processor coupled to the first image sensor and the first temperature sensor and configured to calibrate the thermal image with the first temperature information to output a calibrated thermal image.

11. The device of claim 10 wherein thermal image includes a first plurality of pixels, the processor is configured to determine a second plurality of pixels from the first plurality of pixels that overlap with the second field of view of the temperature sensor and to generate a calibration value based on a the second plurality of pixels and the first temperature information.

12. The device of claim 11 wherein the processor is configured to calibrate each of the first plurality of pixels with the calibration value to generate a third plurality of pixels that form the calibrated thermal image.

13. A method, comprising:
    capturing a first image of an area with an infrared image sensor, the first image including a plurality of pixels;
    capturing temperature information of a first subset of the plurality of pixels of the first image with a temperature sensor;
    determining a calibration value from the temperature information and from the first subset of the plurality of pixels, the determining includes:
    identifying a central pixel of the first subset of pixels that corresponds to a center of a field of view of the temperature sensor and identifying an outer boundary of the field of view of the temperature sensor; and
    outputting a calibrated thermal image by calibrating the plurality of pixels of the first image with the calibration value.

14. The method of claim 13, wherein the determining the calibration value includes generating a weighted average of the temperature information by evaluating each pixel from the central pixel to the pixels that correspond to the outer boundary of the field of view.

* * * * *